US012802411B2

(12) United States Patent
Cho et al.

(10) Patent No.: US 12,802,411 B2
(45) Date of Patent: Nov. 17, 2026

(54) DEVICE AND METHOD FOR MULTI-TASK LEARNING AND A TESTING DEVICE AND TESTING METHOD USING SAME

(71) Applicants: HYUNDAI MOTOR COMPANY, Seoul (KR); KIA CORPORATION, Seoul (KR)

(72) Inventors: Jae Hoon Cho, Seoul (KR); Hyun Kook Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 288 days.

(21) Appl. No.: 18/244,680

(22) Filed: Sep. 11, 2023

(65) Prior Publication Data

US 2024/0312189 A1 Sep. 19, 2024

(30) Foreign Application Priority Data

Mar. 17, 2023 (KR) ........................ 10-2023-0035346

(51) Int. Cl.
*G06V 10/774* (2022.01)
*G06V 10/77* (2022.01)
*G06V 10/776* (2022.01)

(52) U.S. Cl.
CPC ........ *G06V 10/774* (2022.01); *G06V 10/7715* (2022.01); *G06V 10/776* (2022.01)

(58) Field of Classification Search
None
See application file for complete search history.

(56) References Cited

U.S. PATENT DOCUMENTS 11,580,851 B2 * 2/2023 Tan ..................... G06F 18/2415
2023/0154055 A1 * 5/2023 Besenbruch ........... G06N 3/084
375/240.03

(Continued)

FOREIGN PATENT DOCUMENTS

KR 20220013820 A 2/2022

OTHER PUBLICATIONS

Choi et al., "RobustNet: Improving Domain Generalization in Urban-Scene Segmentation via Instance Selective Whitening," Proceedings of the IEEE/CVF Conference on Computer Vision and Pattern Recognition (CVPR), 2021, pp. 11580-11590 (Year: 2021).*

*Primary Examiner* — Soo Shin
(74) *Attorney, Agent, or Firm* — Lempia Summerfield Katz LLC

(57) ABSTRACT

A multi-task learning device includes a feature extraction layer that generates a first feature corresponding to a first image and a second feature corresponding to a second image; a first decoding layer that generates a first task inference result corresponding to the first image; a second decoding layer that generates a second task inference result corresponding to the second image; a first loss layer that generates a first task loss with reference to the first task inference result and a first task ground truth (GT) result corresponding to the first task inference result; a second loss layer that generates a second task loss with reference to the second task inference result and a second task GT result corresponding to the second task inference result; a feature loss layer that generates a feature loss with reference to the first feature and the second feature; and a parameter updater that updates parameters of at least some of the various layers.

8 Claims, 10 Drawing Sheets

(56) References Cited

U.S. PATENT DOCUMENTS

| | | | | |
|---|---|---|---|---|
| 2024/0311979 | A1* | 9/2024 | Cho | G06T 5/50 |
| 2024/0312189 | A1* | 9/2024 | Cho | G06V 10/776 |

* cited by examiner

110

(a)

(b)

(c)

(a)

(b)

(c)

DEVICE AND METHOD FOR MULTI-TASK LEARNING AND A TESTING DEVICE AND TESTING METHOD USING SAME

CROSS-REFERENCE TO RELATED APPLICATION

This application claims the benefit of priority to Korean Patent Application No. 10-2023-0035346, filed in the Korean Intellectual Property Office on Mar. 17, 2023, the entire contents of which are incorporated herein by reference.

TECHNICAL FIELD

The present disclosure relates to a multi-task learning device and method and relates to a test device and method using the same.

BACKGROUND

Multi-task learning is a scheme of simultaneously learning a plurality of tasks by using a plurality of output layers in one deep neural network.

Because hardware resources are inevitably limited due to the nature of autonomous vehicles, in order to process multiple tasks in real time using a plurality of artificial intelligence models under limited hardware resource conditions, multi-task learning schemes utilizing a single public network and multiple output layers have been proposed recently.

However, in order to perform supervised learning based on multi-task learning, a large-scale data set including labels corresponding to all tasks is constructed for each training data (or training image), and a huge amount of time and money is required to build a large data set.

In addition, when learning on a new task is required in a state in which labeling corresponding to existing tasks has already been performed, a labeling process corresponding to a new task is additionally required for all data sets.

SUMMARY

The present disclosure has been made to solve the above-mentioned problems while advantages achieved by the prior art are maintained intact.

Aspects of the present disclosure provide a multi-task learning device and method capable of performing multi-task learning using heterogeneous data sets including labels corresponding to different tasks. Other aspects of the present disclosure provide a test device and method using the same.

Still other aspects of the present disclosure provide a multi-task learning device and method capable of reducing the cost and time required to construct a data set. Still further aspects of the present disclosure provide a test device and method using the same.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a multi-task learning device includes a feature extraction layer that generates a first feature corresponding to a first image and generates a second feature corresponding to a second image by applying a feature extraction operation to the first image and the second image. The first image is included in a first training data set corresponding to a first task, and the second image is included in a second training data set corresponding to a second task. The multi-task learning device also includes a first decoding layer that generates a first task inference result corresponding to the first image by applying a first decoding operation to the first feature. The multi-task learning device also includes a second decoding layer that generates a second task inference result corresponding to the second image by applying a second decoding operation to the second feature. The multi-task learning device also includes a first loss layer that generates a first task loss with reference to the first task inference result and a first task ground truth (GT) result corresponding to the first task inference result. The multi-task learning device also includes a second loss layer that generates a second task loss with reference to the second task inference result and a second task GT result corresponding to the second task inference result. The multi-task learning device also includes a feature loss layer that generates a feature loss with reference to the first feature and the second feature. The multi-task learning device also includes a parameter updater that updates parameters of at least some of the feature extraction layer, the first decoding layer, or the second decoding layer by using at least some of the first task loss, the second task loss, or the feature loss.

In an embodiment, the parameter updater may update parameters of the feature extraction layer and the first decoding layer by using the first task loss. The parameter updater may update parameters of the feature extraction layer and the second decoding layer by using the second task loss. The parameter updater may update parameters of the feature extraction layer by using the feature loss.

In an embodiment, the feature loss layer may generate a variance matrix with reference to the first feature and the second feature and may generate the feature loss with reference to the variance matrix.

In an embodiment, the feature loss layer may generate a first covariance matrix corresponding to the first feature of the first image and a second covariance matrix corresponding to the second feature of the second image, generate the variance matrix with reference to the first covariance matrix and the second covariance matrix, generate an output matrix with reference to the variance matrix and a mask matrix, and generate the feature loss with reference to the output matrix and a GT matrix corresponding thereto.

In an embodiment, a value of a specific cell at a specific position of the mask matrix may be set to a first value when a difference between a value of a first cell at the specific position of the first covariance matrix and a value of a second cell at the specific position of the second covariance matrix is equal to or greater than a preset value. The value of the specific cell may be set to a second value when the difference between the value of the first cell and the value of the second cell is less than the preset value. A value of each cell of the GT matrix may be set to the second value.

In an embodiment, the first training data set may include a label corresponding to the first task, and the second training data set may include a label corresponding to the second task.

According to another aspect of the present disclosure, a multi-task test device includes a feature extraction layer that generates a test feature corresponding to a test image by applying a feature extraction operation to the test image. The multi-task test device also includes a first decoding layer that generates a first task inference result corresponding to the test image by applying a first decoding operation to the test feature and a second decoding layer that generates a second task inference result corresponding to the test image by applying a second decoding operation to the test feature.

According to still another aspect of the present disclosure, a multi-task learning method includes generating a first feature corresponding to a first image and a second feature corresponding to a second image by applying a feature extraction operation to the first image and the second image. The first image is included in a first training data set corresponding to a first task and the second image is included in a second training data set corresponding to a second task. The multi-task learning method also includes generating a first task inference result corresponding to the first image by applying a first decoding operation to the first feature and generating a second task inference result corresponding to the second image by applying a second decoding operation to the second feature. The multi-task learning method also includes generating a first task loss with reference to the first task inference result and a first task ground truth (GT) result corresponding to the first task inference result and includes generating a second task loss with reference to the second task inference result and a second task GT result corresponding to the second task inference result. The learning method also includes generating a feature loss with reference to the first feature and the second feature and updating parameters of at least some of the feature extraction layer, the first decoding layer, and the second decoding layer by using at least some of the first task loss, the second task loss, and the feature loss.

In an embodiment, the updating of the parameter may include updating parameters of the feature extraction layer and the first decoding layer by using the first task loss, updating parameters of the feature extraction layer and the second decoding layer by using the second task loss, and updating parameters of the feature extraction layer by using the feature loss.

In an embodiment, generating the feature loss may include generating a variance matrix with reference to the first feature and the second feature and generating the feature loss with reference to the variance matrix.

In an embodiment, generating the feature loss may include generating a first covariance matrix corresponding to the first feature of the first image and a second covariance matrix corresponding to the second feature of the second image. Generating the feature loss may also include generating the variance matrix with reference to the first covariance matrix and the second covariance matrix, generating an output matrix with reference to the variance matrix and a mask matrix, and generating the feature loss with reference to the output matrix and a GT matrix corresponding to the output matrix.

In an embodiment, a value of a specific cell at a specific position of the mask matrix may be set to a first value when a difference between a value of a first cell at the specific position of the first covariance matrix and a value of a second cell at the specific position of the second covariance matrix is equal to or greater than a preset value. The value of the specific cell may be set to a second value when the difference between the value of the first cell and the value of the second cell is less than the preset value. A value of each cell of the GT matrix may be set to the second value.

In an embodiment, the first training data set may include a label corresponding to the first task, and the second training data set may include a label corresponding to the second task.

According to still another aspect of the present disclosure, a multi-task test method includes generating a test feature corresponding to a test image by applying a feature extraction operation to the test image. The multi-task test method also includes generating a first task inference result corresponding to the test image by applying a first decoding operation to the test feature. The multi-task test method also includes generating a second task inference result corresponding to the test image by applying a second decoding operation to the test feature.

BRIEF DESCRIPTION OF THE DRAWINGS

The above and other objects, features, and advantages of the present disclosure should be more apparent from the following detailed description taken in conjunction with the accompanying drawings.

With regard to description of drawings, the same or similar elements may be marked by the same or similar reference numerals.

DETAILED DESCRIPTION

Figure 1:
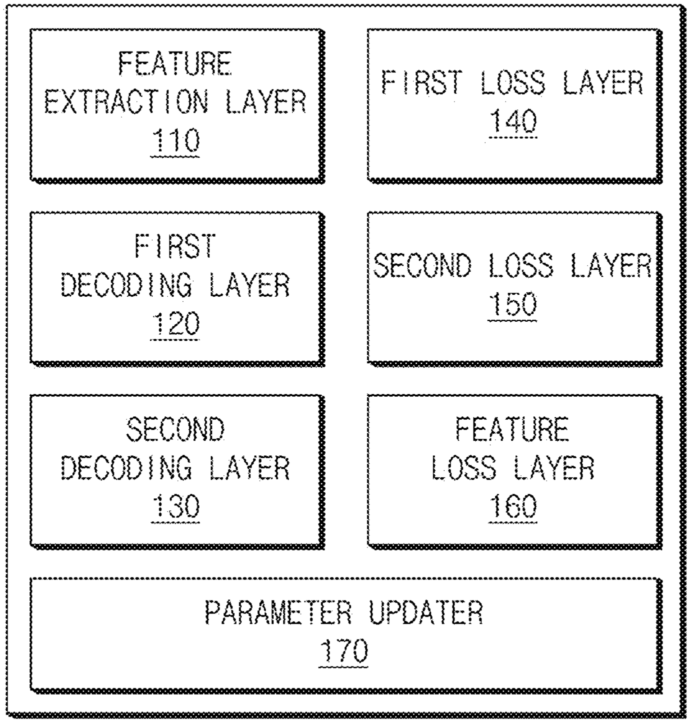
FIG. 1 is a block diagram illustrating the configuration of a multi-task learning device according to an embodiment of the present disclosure.

Hereinafter, some embodiments of the present disclosure are described in detail with reference to the drawings. In adding the reference numerals to the components of each drawing, it should be noted that the identical or equivalent components are designated by the identical numeral even when the components are displayed on other drawings. Further, in describing the embodiments of the present disclosure, a detailed description of the related known configuration or function has been omitted where it has been determined that the have interfered with the detailed description would understanding of the embodiment of the present disclosure.

In describing the components s of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. The terms should not be interpreted in an idealized or overly formal sense unless expressly so defined herein. When a component, device, element, or the like of the present disclosure is described as having a purpose or performing an operation, function, or the like, the component, device, element, or the like should be considered herein as being “configured to” meet that purpose or to perform that operation or function. Each of the component, device, element, and the like may separately embody or be included with a processor and a memory, such as a non-transitory computer readable media, as part of the apparatus.

Hereinafter, with reference to FIGS. 1-10, embodiments of the present disclosure are described in detail.

FIG. 1 is a block diagram illustrating the configuration of a multi-task learning device 100 according to an embodiment of the present disclosure.

Referring to FIG. 1, the multi-task learning device 100 according to an embodiment of the present disclosure may include a feature extraction layer 110, a first decoding layer 120, a second decoding layer 130, a first loss layer 140, a second loss layer 150, a feature loss layer 160, and a parameter updater 170.

Operations of the plurality of layers and the parameter updater 170 included in the multi-task learning device 100 according to an embodiment of the present disclosure shown in FIG. 1 are described with reference to FIG. 2.

Figure 2:
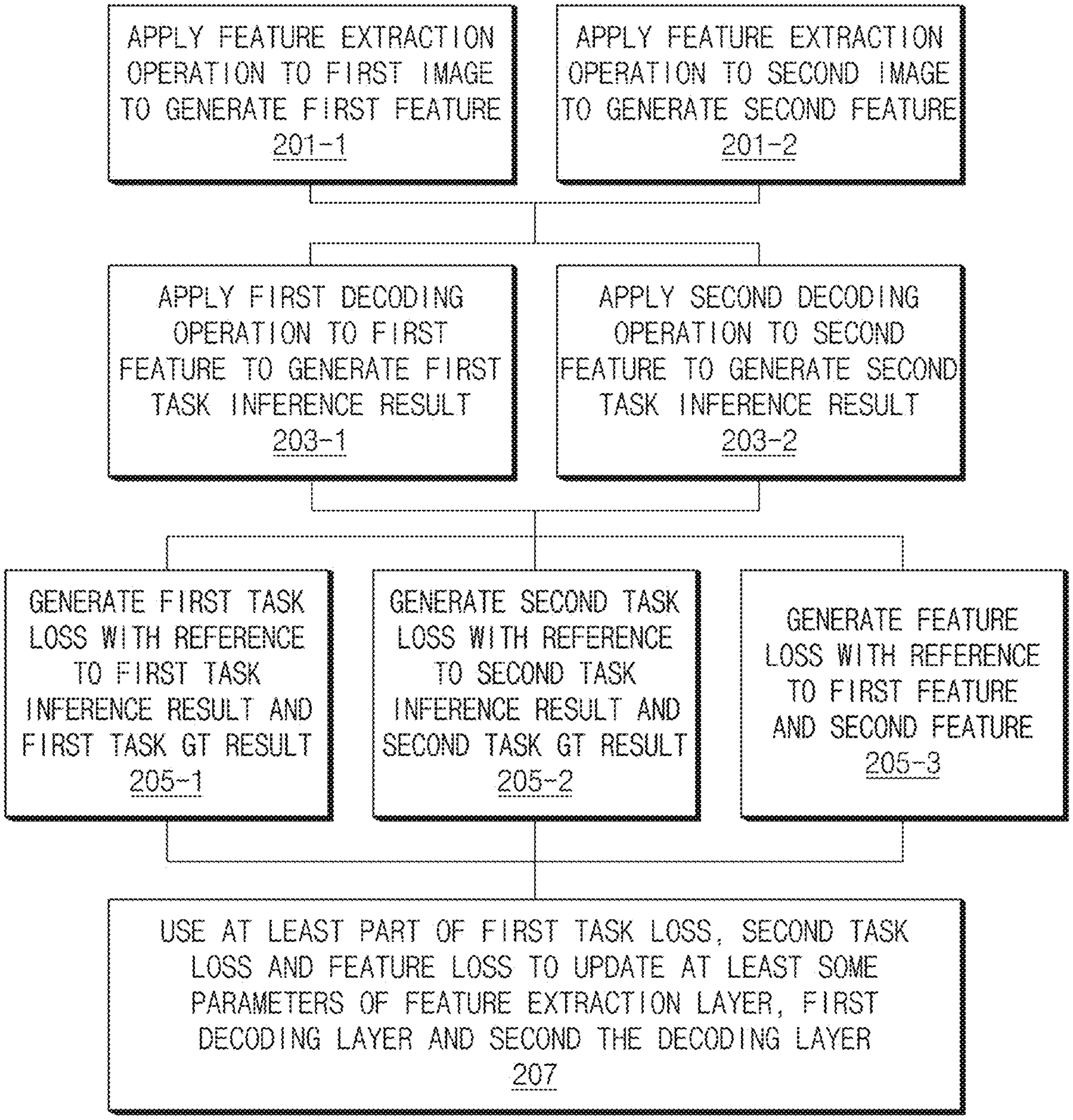
FIG. 2 is a flowchart illustrating a multi-task learning method according to an embodiment of the present disclosure.

Referring to FIG. 2, in operation 201-1, the feature extraction layer 110 may apply a feature extraction operation to a first image included in a first training data set corresponding to a first task to generate a first feature (first feature map) corresponding to the first image.

In operation 201-2, the feature extraction layer 110 may apply the feature extraction operation to a second image included in a second training data set corresponding to a second task to generate a second feature (second feature map) corresponding to the second image.

As an example, the first task and the second task may be one of a segmentation task, a depth estimation task, an object detection task, or a classification task. However, the types of tasks described above are merely examples to help understand aspects of the present disclosure, and the tasks applied to the embodiments of the present disclosure are not limited to the examples.

In addition, the first training data set may include a label corresponding to the first task, and the second training data set may include a label corresponding to the second task. As an example, when a specific task is a segmentation task, specific training images included in a specific training data set may include at least a segmentation label. Of course, a specific training data set corresponding to a segmentation task may additionally include a label (e.g., an object detection label) corresponding to another task.

In addition, the first task corresponding to the first training data set and the second task corresponding to the second training data set may be different from each other, but the embodiments are not limited thereto.

As an example, even when both the first task and the second task are object detection tasks, the first training data set corresponding to the first task may relate to an image of a road environment in Korea, and the second training data set corresponding to the second task may relate to an image of a road environment in United States. Because the characteristics of the road environment are different for each country, the performance of an object detector learned only with a training data set for one country may deteriorate in other countries.

Similar to the above, the first training data set corresponding to the first task may relate to an image of a winter road environment in Korea, and the second training data set corresponding to the second task may relate to an image of a summer road environment in Korea. Because the characteristics of the road environment are different for each season, the performance of an object detector learned only with a training data set for one season may deteriorate in another season.

For reference, a structure of the feature extraction layer 110 is described below with reference to FIG. 4.

In operation 203-1, the first decoding layer 120 may generate a first task inference result corresponding to the first image by applying a first decoding operation to the first feature.

As an example, when the first task is an object detection task, the first decoding layer 120 may generate a bounding box with reference to the first feature (first feature map) and may generate an object detection result, which is a result of classifying which object exists within each bounding box, as the first task inference result.

In addition, in operation 203-2, the second decoding layer 130 may generate a second task inference result corresponding to the second image by applying a second decoding operation to the second feature.

For example, when the second task is a classification task, the first decoding layer 130 may apply a fully-connected operation to the second feature (second feature map) to generate a result of classifying the class of the object present in the second image as the second task inference result.

In operation 205-1, the first loss layer 140 may generate a first task loss with reference to the first task inference result and the corresponding first task ground truth (GT) result.

In addition, in operation 205-2, the second loss layer 150 may generate a second task loss with reference to the second task inference result and the corresponding second task GT result.

In addition, in operation 205-3, the feature loss layer 160 may generate a feature loss with reference to the first feature and the second feature.

For reference, a process of generating a feature loss by the feature loss layer 160 is described below with reference to FIG. 5.

In addition, in operation 207, the parameter updater 170 may use at least a part of the first task loss, the second task loss, or the feature loss to update at least some parameters of the feature extraction layer 110, the first decoding layer 120, or the second decoding layer 130.

As an example, the parameter updater 170 may update parameters of the feature extraction layer 110 and the first decoding layer 120 by using the first task loss.

In addition, the parameter updater 170 may update parameters of the feature extraction layer 110 and the second decoding layer 130 by using the second task loss.

In addition, the parameter updater 170 may update parameters of the feature extraction layer 110 by using the feature loss.

For reference, the parameter updating described above may be performed sequentially.

As an example, in the first iteration, the parameter updater 170 may perform (i) updating the parameters of the feature extraction layer 110 and the first decoding layer 120 by using the first task loss. Then, the parameter updater 170 may perform (ii) updating parameters of the feature extraction layer 110 by using the feature loss after updating parameters of the feature extraction layer 110 and the second decoding layer 130 by using the second task loss.

In addition, in the second iteration, the parameter updater 170 may perform (i) updating the parameters of the feature extraction layer 110 and the second decoding layer 130 by using the second task loss. Then, the parameter updater 170 may perform (ii) updating parameters of the feature extraction layer 110 by using the feature loss after updating parameters of the feature extraction layer 110 and the first decoding layer 120 by using the first task loss.

For reference, because the learning sequence is only an example to aid understanding, the embodiments are not limited to thereto.

The configuration and operation of the multi-task learning device 100 according to an embodiment of the present disclosure are schematically described above with reference to FIGS. 1 and 2. Hereinafter, with reference to FIGS. 3-5, the operation of the multi-task learning device 100 according to an embodiment of the present disclosure is described in more detail.

Figure 3:
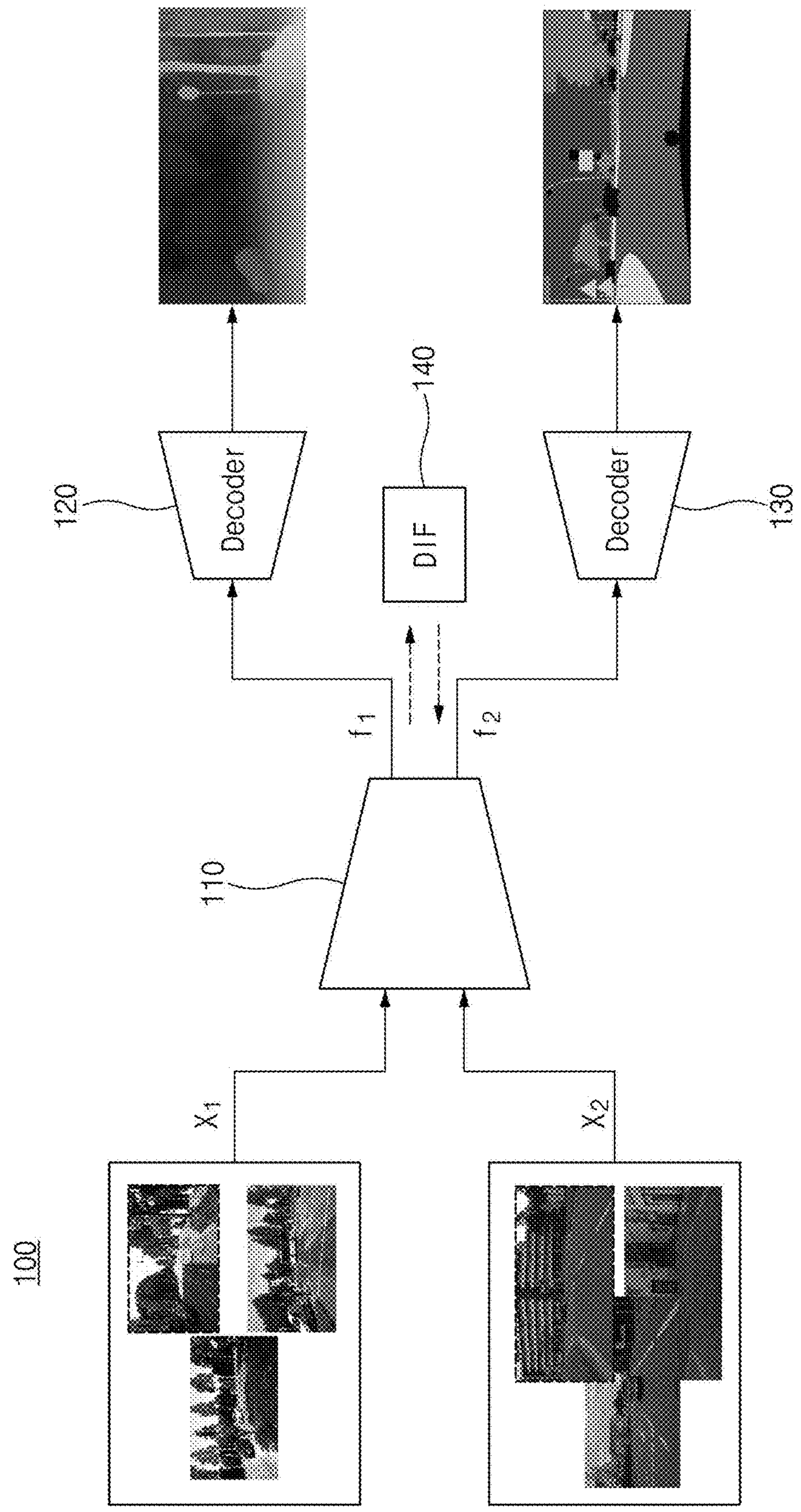
FIG. 3 is a diagram illustrating the operation of a multi-task learning device according to an embodiment of the present disclosure.

Referring to FIG. 3, the multi-task learning device 100 may input a first image $X_1$ included in the first training data set (e.g., dataset A) corresponding to the first task and a second image $X_2$ included in the second training data set (e.g., dataset B) corresponding to the second task to the feature extraction layer 110.

As an example, a KITTI dataset including depth labels may be used as the first training data set, and a Cityscapes dataset including segmentation labels may be used as the second training data set. However, the training data set that may be used in the present disclosure is not limited to the above examples.

In addition, the first image and the second image may have a specified size, as an example, a value of pixels of a height of 512 and a width of 1024, and a batch size may be '8', but is not limited thereto.

In addition, the multi-task learning device 100 may apply a feature extraction operation to the first image $X_1$ and the second image $X_2$ through the feature extraction layer 110, respectively to generate a first feature (first feature map) $f_1$ corresponding to the first image $X_1$ and generate a second feature (second feature map) $f_2$ corresponding to the second image $X_2$.

In addition, the multi-task learning device 100 may apply the first decoding operation and the second decoding operation to the first feature $f_1$ and the second feature $f_2$ through the first decoding layer 120 and the second decoding layer 130, respectively to generate the first task inference result corresponding to the first image and generate the second task inference result corresponding to the second image.

For reference, FIG. 3 illustrates a depth prediction result as the first task inference result and the segmentation result (segmentation prediction) as the second task inference result.

In addition, the multi-task learning device 100 may generate a first task loss with reference to the first task inference result and the corresponding first task GT result through the first loss layer 140. The multi-task learning device 100 may also generate a second task loss with reference to the second task inference result and the corresponding second task GT result through the second loss layer 150. The multi-task learning device 100 may also generate the feature loss with reference to the first feature and the second feature through the feature loss layer 160.

When the first task loss, the second task loss, and the feature loss are generated as described above, the multi-task learning device 100 may use at least some of the first task loss, the second task loss, or the feature loss through the parameter updater 170 to update parameters of at least some of the feature extraction layer 110, the first decoding layer 120, or the second decoding layer 130.

Figure 4:
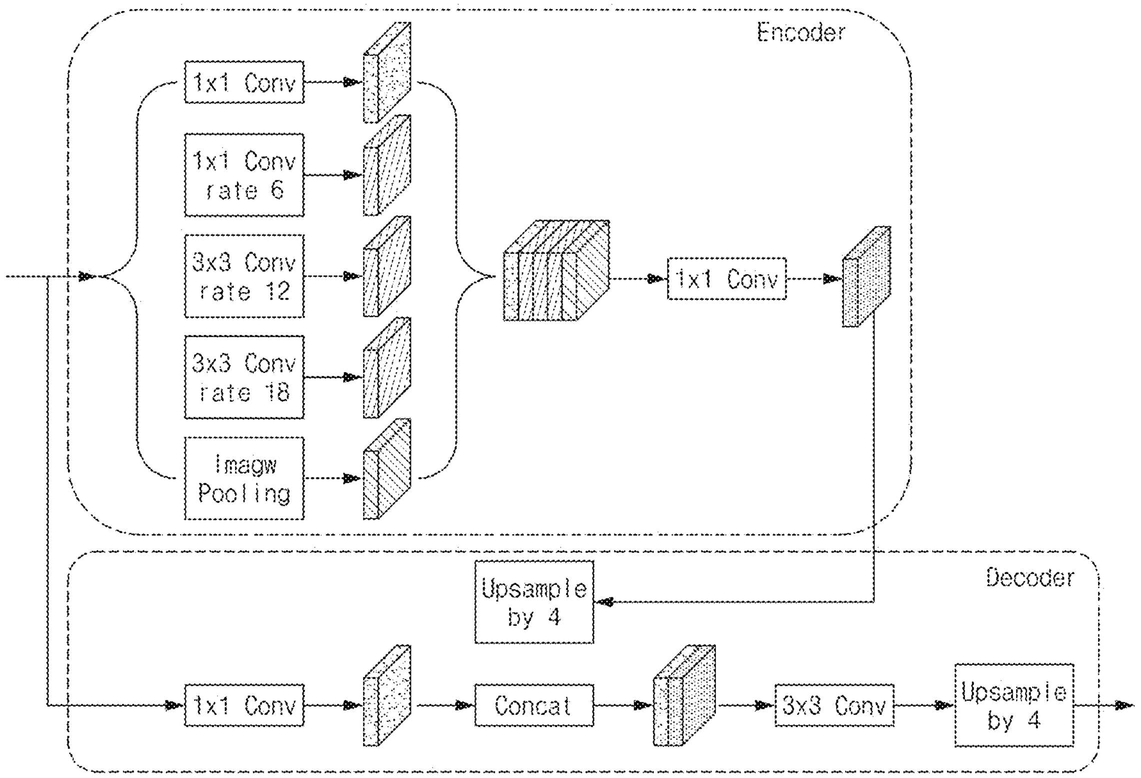
FIG. 4 is a diagram illustrating a feature extraction layer of a multi-task learning device according to an embodiment of the present disclosure.

FIG. 4 illustrates a structure of the feature extraction layer 110.

As an example, the feature extraction layer 110 may be a layer based on a Deeplabv3+ network as shown in FIG. 4.

As an example, a low level feature may be generated by applying an atrous convolution operation to an input image through an encoder of the feature extraction layer 110.

In addition, after applying a 1*1 convolution operation and a relu operation to the low level feature through a decoder of the feature extraction layer 110 and concatenating with the 4-fold up-sampled low level output, a feature corresponding to the input image may be output by applying a convolution operation having a kernel size of 3 and performing upsampling to have the same resolution as the input image.

Meanwhile, a process of generating a feature loss is described below.

The multi-task learning device 100 according to an embodiment of the present disclosure may generate a variance matrix with reference to the first feature and the second feature through the feature loss layer 160 and may generate a feature loss with reference to the variance matrix.

Figure 5:
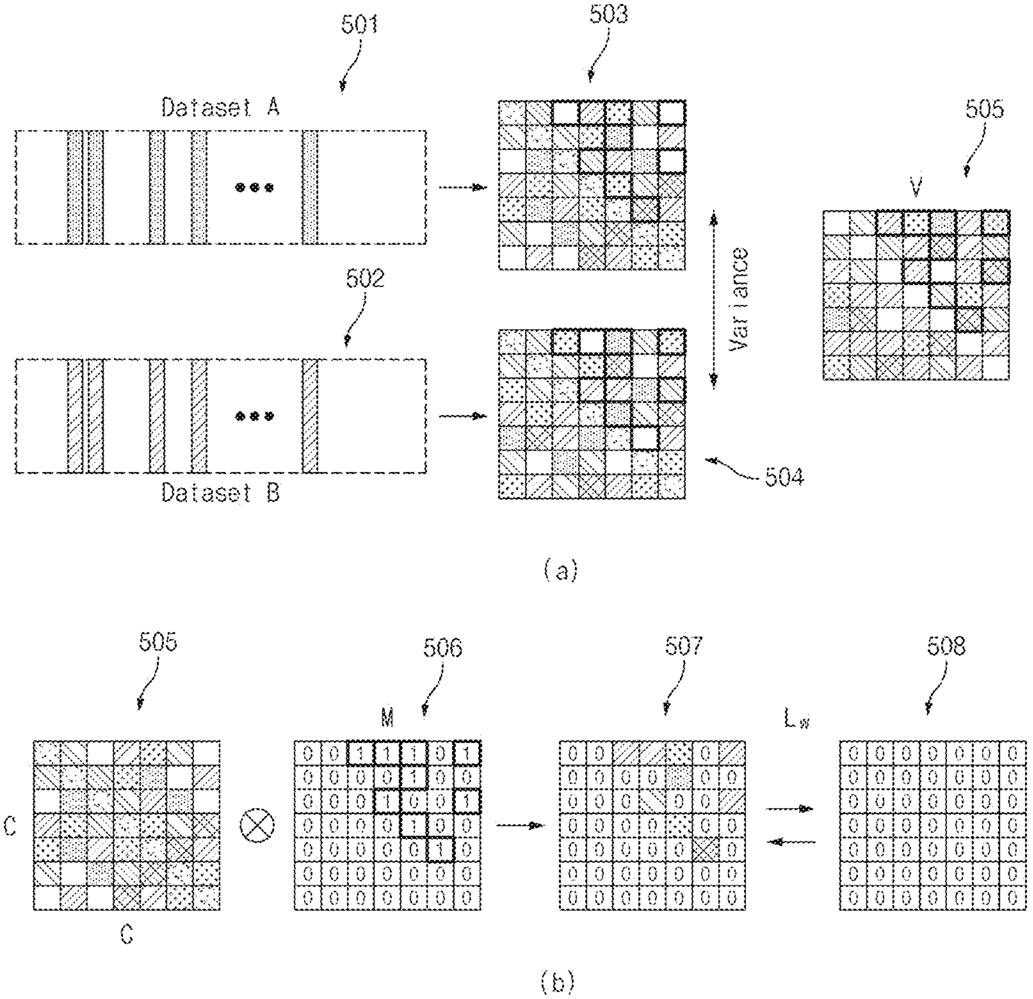
FIG. 5 is a diagram illustrating a process of generating a feature loss through a feature loss layer by a multi-task learning device according to an embodiment of the present disclosure.

As an example, referring to (a) of FIG. 5, the multi-task learning device 100 may generate a first covariance matrix 503 corresponding to a first feature 501 of a first image through the feature loss layer 160 and may generate a second covariance matrix 504 corresponding to a second feature 502 of the second image.

In addition, the multi-task learning device 100 may generate a variance matrix (V) 505 with reference to the first covariance matrix 503 and the second covariance matrix 504 through the feature loss layer 160.

As an example, the multi-task learning device 100 may obtain averages for each feature of the first covariance matrix 503 and the second covariance matrix 504 through the feature loss layer 160, add them, and divide them by 2. Then, the variance matrix 505 may be generated by calculating the average of the squared deviations for each feature.

In addition, referring to (b) of FIG. 5, the multi-task learning device 100 may generate an output matrix 507 with reference to the variance matrix 505 and a mask matrix 506 through the feature loss layer 160.

In this case, the multi-task learning device 100 may generate the output matrix 507 by applying an element-wise multiplication operation to the variance matrix 505 and the mask matrix 506 through the feature loss layer 160.

As an example, when a difference between a value of a first cell at a specific position of the first covariance matrix 503 and a value of a second cell at a specific position of the second covariance matrix 504 is equal to or greater than a preset value, the value of a specific cell at the specific position of the mask matrix (M) 506 is set to a first value (e.g., '1'). When the difference between the value of the first cell and the value of the second cell is less than a preset value, the value of the specific cell at the specific position of the mask matrix 506 may be set to a second value (e.g., '0 (zero)').

As another example, as expressed as Equation 1 below, the difference between the value of the first cell at a specific position of the first covariance matrix 503 and the value of the second cell at a specific position of the second covariance matrix 504 is equal to or greater than a threshold value, a set $G_{low}$ of the values of the first cell and the second cell at a specific position may be set. When the value of a cell at a specific position of the variance matrix (V) 505 corresponds to the corresponding set $G_{low}$, the value of a specific cell at a specific position of the mask matrix (M) 506 may be set to a first value (e.g., '1'). When the value of a cell at a specific position of the variance matrix (V) 505 does not correspond to the corresponding set $G_{low}$, the value of a specific cell at a specific position of the mask matrix (M) 506 is set to a second value (e.g., '0 (zero)').

$$M = \begin{cases} 1, & \text{if } V \in G_{low} \\ 0, & \text{otherwise} \end{cases} \qquad \text{Equation 1}$$

For reference, in FIG. 5, a specific portion, in which the difference between the value of the first cell at the specific position of the first covariance matrix 503 and the value of the second cell at the specific position of the second covariance matrix 504 is equal to or greater than a preset value, is indicated by thick-lined boxes 511.

In addition, the multi-task learning device 100 may generate a feature loss $L_w$ with reference to the output matrix 507 and the corresponding GT matrix 508 through the feature loss layer 160. In this case, the value of each cell of the GT matrix 508 may be set to a second value (e.g., '0 (zero)'). For reference, the feature loss may be a loss according to L1 loss. As an example, the multi-task learning device 100 may generate the feature loss $L_w$ through the feature loss layer 160 according to following Equation 2.

$$L_W = \sum_i \left\| \sum_s (i) \otimes M(i) \right\|_1 \qquad \text{Equation 2}$$

In this case, the value inside an L1 loss operator (i.e., $\| \|_1$) may be the output matrix 507 generated by applying an element-wise multiplication operation to the variance matrix 505 and the mask matrix 506.

For reference, cross-entropy loss may be used for a segmentation result, and MSE loss may be used for a depth estimation result.

As described above, by updating the parameters of the feature extraction layer 110 by using the feature loss generated with reference to the first feature and the second feature, it is possible to learn relevance that can be obtained from heterogeneous data sets, so that the feature extraction layer 110 may generate a feature that can be applied to all tasks without being biased toward a specific task.

In other words, the feature loss may be a loss that is used to better extract common features by the feature extraction layer 110 in performing different tasks.

As described above, in a state in which at least some parameters of the feature extraction layer 110, the first decoding layer 120, or the second decoding layer 130 is updated, a case in which an embodiment of the present disclosure is applied to an actual test (e.g., multi-task performance on a single image) is described below.

For reference, in an actual test operation, because an additional learning process using the parameter updater 170 is not essential, a multi-task test device according to an embodiment of the present disclosure may include a feature extraction layer completed with learning, a first decoding layer completed with learning, and a second decoding layer completed with learning. In addition, because a learning process using a plurality of training images specialized for a plurality of tasks is not essential in the actual test operation, the multi-task test device according to an embodiment of the present disclosure may acquire a single test image and may generate at least some of a plurality of task inference results corresponding to the single test image.

Figure 6:
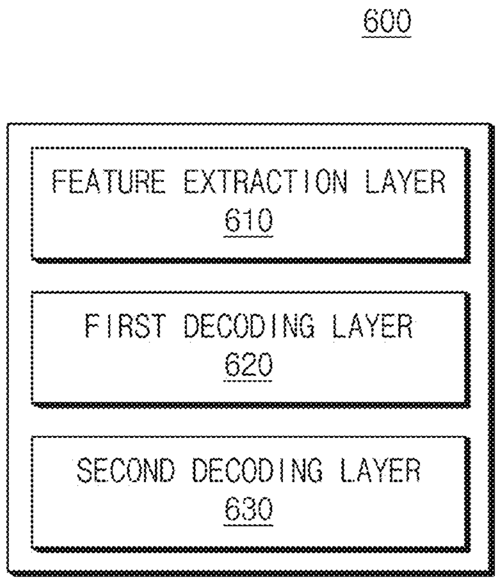
FIG. 6 is a block diagram illustrating the configuration of a multi-task test device according to an embodiment of the present disclosure.

FIG. 6 is a block diagram illustrating the configuration of a multi-task test device 600 according to an embodiment of the present disclosure.

Referring to FIG. 6, the multi-task test device 600 according to an embodiment of the present disclosure may include a feature extraction layer 610, a first decoding layer 620, and a second decoding layer 630.

Operations of the plurality of layers included in the multi-task test device 600 according to an embodiment of the present disclosure shown in FIG. 6 are described with reference to FIG. 7.

Figure 7:
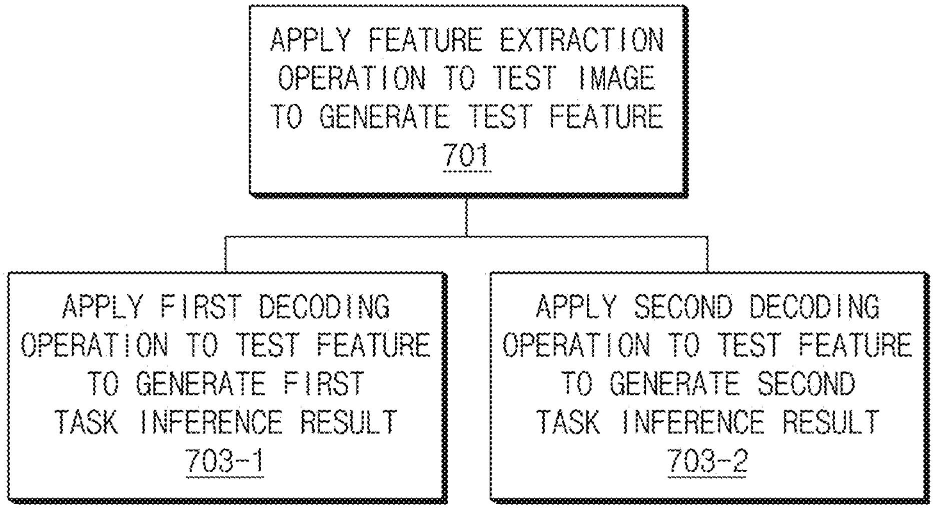
FIG. 7 is a flowchart illustrating a multi-task test method according to an embodiment of the present disclosure.

Referring to FIG. 7, in operation 701, the feature extraction layer 610 may apply a feature extraction operation to a test image to generate a test feature corresponding to the test image.

In addition, in operation 703-1, the first decoding layer 620 may generate a first task inference result corresponding to the test image by applying a first decoding operation to the test feature.

As an example, when the first task is a segmentation task, the first decoding layer 620 may generate, as the first task inference result, a result of classifying the class for each pixel with reference to the first feature (first feature map).

In operation 703-2, the second decoding layer 630 may generate a second task inference result corresponding to the test image by applying a second decoding operation to the test feature.

The configuration and operation of the multi-task test device 600 according to an embodiment of the present disclosure are substantially described above with reference to FIGS. 6 and 7. Hereinafter, with reference to FIG. 8, the operation of the multi-task test device 600 according to an embodiment of the present disclosure is described in more detail.

Figure 8:
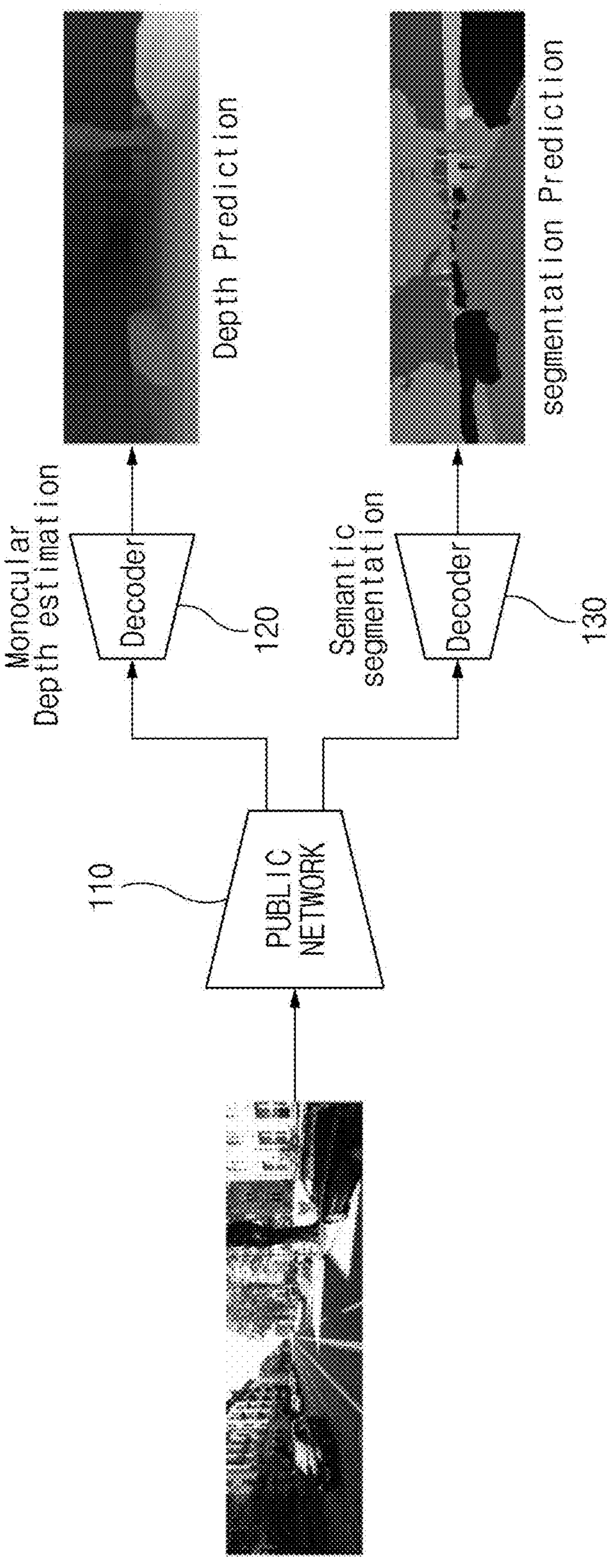
FIG. 8 is a diagram illustrating the operation of a multi-task test device according to an embodiment of the present disclosure.

Referring to FIG. 8, the multi-task test device 600 may input a test image to the feature extraction layer 610.

In addition, the multi-task test device 600 may generate a test feature (test feature map) corresponding to the test image by applying a feature extraction operation to the test image through the feature extraction layer 610.

In addition, the multi-task test device 600 may apply a first decoding operation and a second decoding operation to each of the test feature through the first decoding layer 620 and the second decoding layer 630, respectively and may generate a first test inference result and a second test inference result corresponding to the test image.

For reference, FIG. 8 illustrates a depth prediction result as the first task inference result and the segmentation result (segmentation prediction) as the second task inference result.

Figure 9:
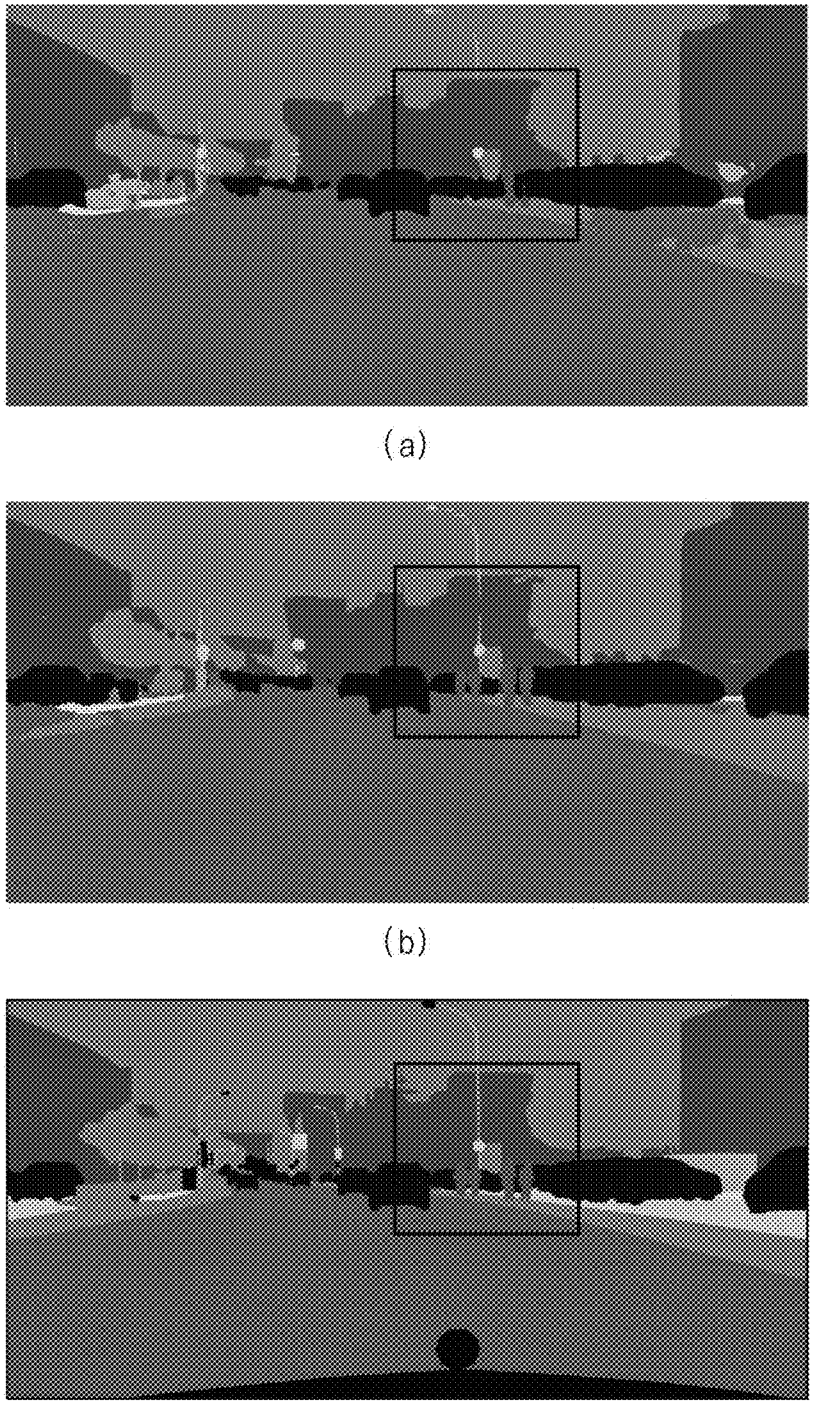
FIG. 9 is a diagram for comparing performance of a segmentation device learned according to a conventional single-task learning method and a segmentation device learned according to a multi-task learning method according to an embodiment of the present disclosure.

FIG. 9 is a diagram for comparing performance of a segmentation device learned according to a conventional single-task learning method and a segmentation device learned according to a multi-task learning method according to an embodiment of the present disclosure.

In detail, (a) of FIG. 9 illustrates a segmentation result for a test image of a segmentation device learned according to a conventional single-task learning method. Further, (b) of FIG. 9 illustrates a segmentation result for a test image of a multi-task test device 600 using a parameter learned by a multi-task learning method according to an embodiment of the present disclosure. Also, (c) of FIG. 9 illustrates a segmentation correct answer (GT) for a test image.

When determining based on (c) of FIG. 9, which is the correct answer, the result of the segmentation device learned according to the conventional single-task learning method ((a) of FIG. 9) is not good. On the other hand, it may be understood that the segmentation result ((b) of FIG. 9) of the multi-task test device 600 according to an embodiment of the present disclosure is very good.

Figure 10:
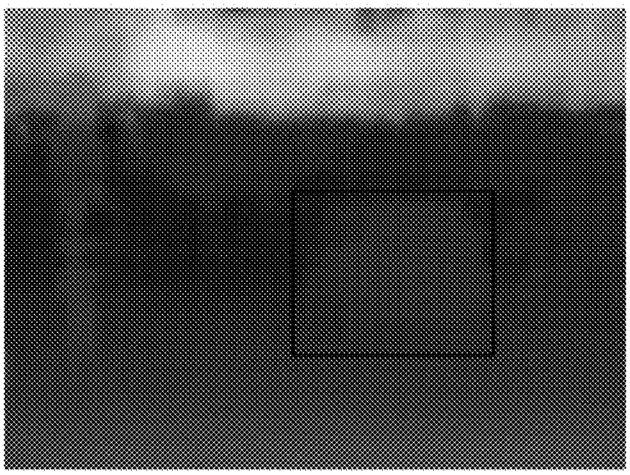
FIG. 10 is a diagram for comparing performance of a depth estimation device learned according to a conventional single-task learning method and a depth estimation device learned according to a multi-task learning method according to an embodiment of the present disclosure.
Figure 10:
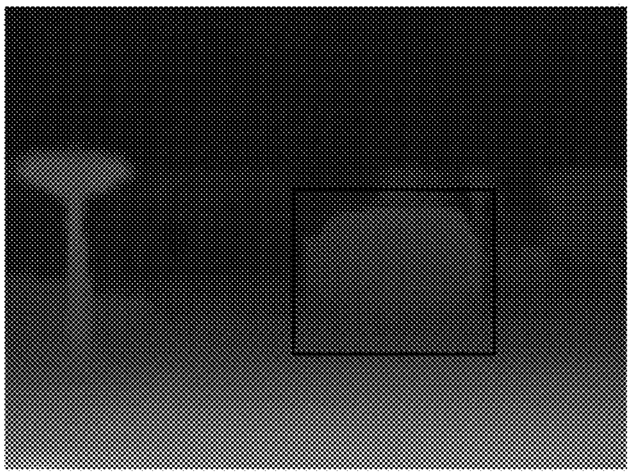
Figure 10:
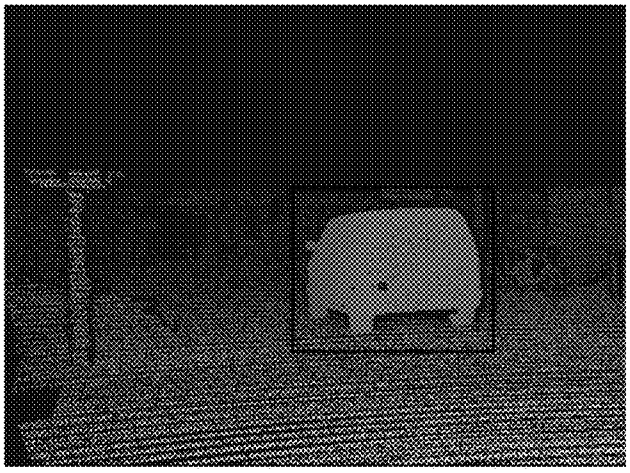

FIG. 10 is a diagram for comparing performance of a depth estimation device learned according to a conventional single-task learning method and a depth estimation device learned according to a multi-task learning method according to an embodiment of the present disclosure.

In detail, (a) of FIG. 10 illustrates a depth estimation result for a test image of a depth estimation device learned according to a conventional single-task learning method. Further, (b) of FIG. 10 illustrates a depth estimation result for a test image of a multi-task test device 600 using a parameter learned by a multi-task learning method according to an embodiment of the present disclosure. Also, (c) of FIG. 10 illustrates a depth correct answer (GT) for a test image.

When determining based on (c) of FIG. 10, which is the correct answer, the result of the depth estimation device learned according to the conventional single-task learning method ((a) of FIG. 10) is not good. On the other hand, it may be understood that the depth estimation result ((b) of FIG. 10) of the multi-task test device 600 according to an embodiment of the present disclosure is very good.

In addition, a multi-task test device according to the present disclosure may save a memory by sharing a feature extraction layer with decoding layers for each task. Accordingly, it is possible to save time required to perform each task.

The present technology may provide a method of efficiently performing multi-task learning using heterogeneous data sets each including labels corresponding to different tasks.

In addition, the present technology may provide a method of significantly reducing cost and time required to build a data set.

In addition, various effects that are directly or indirectly understood through the present disclosure may be provided.

Although embodiments of the present disclosure have been described for illustrative purposes, those having ordinary skill in the art should appreciate that various modifications, additions, and substitutions are possible, without departing from the scope and spirit of the disclosure.

Therefore, the embodiments disclosed in the present disclosure are provided for the sake of descriptions, without limiting the technical concepts of the present disclosure. It should be understood that such embodiments are not intended to limit the scope of the technical concepts of the present disclosure. The protection scope of the present disclosure should be understood by the claims below, and all the technical concepts within the equivalent scopes should be interpreted to be within the scope of the present disclosure.

What is claimed is:

1. A multi-task learning device comprising:

a feature extraction layer configured to generate a first feature corresponding to a first image and generate a second feature corresponding to a second image by applying a feature extraction operation to the first image and the second image, wherein the first image is included in a first training data set corresponding to a first task, and the second image is included in a second training data set, which is a different training data set from the first training data set, corresponding to a second task, which is a different task from the first task;

a first decoding layer configured to generate a first task inference result corresponding to the first image by applying a first decoding operation to the first feature;

a second decoding layer configured to generate a second task inference result corresponding to the second image by applying a second decoding operation to the second feature;

a first loss layer configured to generate a first task loss with reference to the first task inference result and a first task ground truth (GT) result corresponding to the first task inference result;

a second loss layer configured to generate a second task loss with reference to the second task inference result and a second task GT result corresponding to the second task inference result;

a feature loss layer configured to generate a feature loss based on the first feature extracted from the first data training set and the second feature extracted from the second data training set; and a parameter updater configured to update parameters of at least some of the feature extraction layer, the first decoding layer, or the second decoding layer by using at least some of the first task loss, the second task loss, or the feature loss, wherein the feature loss layer is further configured to:

generate a first covariance matrix corresponding to the first feature of the first image and a second covariance matrix corresponding to the second feature of the second image;

generate a variance matrix with reference to the first covariance matrix and the second covariance matrix;

generate an output matrix by applying an element-wise multiplication operation to the variance matrix and a mask matrix; and generate the feature loss with reference to the output matrix and a GT matrix corresponding to the output matrix, wherein the first task inference result includes depth prediction result, and wherein the second task inference result includes segmentation prediction.

2. The multi-task learning device of claim 1, wherein the parameter updater is configured to:

update parameters of the feature extraction layer and the first decoding layer by using the first task loss;

update parameters of the feature extraction layer and the second decoding layer by using the second task loss; and update parameters of the feature extraction layer by using the feature loss.

3. The multi-task learning device of claim 1, wherein the first training data set includes a label corresponding to the first task, and wherein the second training data set includes a label corresponding to the second task.

4. The multi-task learning device of claim 1, wherein:

the feature extraction layer is further configured to generate a test feature corresponding to a test image by applying a feature extraction operation to the test image;

the first decoding layer is further configured to generate a first task inference result corresponding to the test image by applying a first decoding operation to the test feature; and the second decoding layer is further configured to generate a second task inference result corresponding to the test image by applying a second decoding operation to the test feature.

5. A multi-task learning method comprising:

generating a first feature corresponding to a first image and a second feature corresponding to a second image by applying a feature extraction operation to the first image and the second image, wherein the first image is included in a first training data set corresponding to a first task, and the second image is included in a second training data set, which is a different training data set from the first training data set, corresponding to a second task, which is different task from the first task;

generating a first task inference result corresponding to the first image by applying a first decoding operation to the first feature;

generating a second task inference result corresponding to the second image by applying a second decoding operation to the second feature;

generating a first task loss with reference to the first task inference result and a first task ground truth (GT) result corresponding to the first task inference result;

generating a second task loss with reference to the second task inference result and a second task GT result corresponding to the second task inference result;

generating a feature loss based on the first feature extracted from the first training data set and the second feature extracted from the second training data set; and updating parameters of at least some of a feature extraction layer, a first decoding layer, or a second decoding layer by using at least some of the first task loss, the second task loss, or the feature loss, wherein generating the feature loss includes:

generating a first covariance matrix corresponding to the first feature of the first image and a second covariance matrix corresponding to the second feature of the second image;

generating a variance matrix with reference to the first covariance matrix and the second covariance matrix;

generating an output matrix by applying an element-wise multiplication operation to the variance matrix and a mask matrix; and generating the feature loss with reference to the output matrix and a GT matrix corresponding to the output matrix, wherein the first task inference result includes depth prediction result, and wherein the second task inference result includes segmentation prediction.

6. The multi-task learning method of claim 5, wherein updating the parameters includes:

updating parameters of the feature extraction layer and the first decoding layer by using the first task loss;

updating parameters of the feature extraction layer and the second decoding layer by using the second task loss; and updating parameters of the feature extraction layer by using the feature loss.

7. The multi-task learning method of claim 5, wherein the first training data set includes a label corresponding to the first task, and wherein the second training data set includes a label corresponding to the second task.

8. A multi-task test method using a parameter updated by the multi-task learning method according to claim 5, the multi-task test method comprising:

generating a test feature corresponding to a test image by applying a feature extraction operation to the test image;

generating a first task inference result corresponding to the test image by applying a first decoding operation to the test feature; and generating a second task inference result corresponding to the test image by applying a second decoding operation to the test feature.

* * * * *